(12) United States Patent  (10) Patent No.: US 7,802,420 B2
Poojary et al.  (45) Date of Patent: Sep. 28, 2010

(54) CATALYST COMPOSITION AND STRUCTURE FOR A DIESEL-FUELED AUTOTHERMAL REFORMER PLACED IN AND EXHAUST STREAM

(75) Inventors: Damodara M. Poojary, Cupertino, CA (US); Ralph Albert Dalla Betta, Mountainview, CA (US); Jon Gilbert McCarty, Menlo Park, CA (US)

(73) Assignee: Eaton Corporation, Cleveland, OH (US)

( * ) Notice: Subject to any disclaimer, the term of this patent is extended or adjusted under 35 U.S.C. 154(b) by 729 days.

(21) Appl. No.: 11/881,318

(22) Filed: Jul. 26, 2007

(65) Prior Publication Data

US 2009/0025375 A1    Jan. 29, 2009

(51) Int. Cl.
*F01N 3/00* (2006.01)
(52) U.S. Cl. .............................. 60/286; 60/295; 60/301; 422/170; 422/177
(58) Field of Classification Search .................. 60/286, 60/295, 301; 422/170, 171, 174, 177; 48/199 FM, 48/127.1, 127.7, 127.9; 423/239.2; 502/303, 502/339, 527.12
See application file for complete search history.

(56) References Cited

U.S. PATENT DOCUMENTS 4,919,902 A    4/1990  Bricker et al.
4,923,842 A    5/1990  Summers
5,116,800 A    5/1992  Williamson et al.
5,130,114 A *  7/1992  Igarashi ....................... 423/652
6,464,946 B1 * 10/2002 Yamada et al. ............... 422/177
6,692,712 B1   2/2004  Andersen
6,823,662 B1  11/2004  Yamamoto et al.
7,063,642 B1 * 6/2006  Hu et al. ....................... 477/100
7,624,570 B2 * 12/2009 Reuter et al. ................... 60/286
7,628,009 B2 * 12/2009 Hu et al. ........................ 60/285
2004/0043343 A1 * 3/2004 Kamijo ........................... 431/2
2004/0050037 A1   3/2004  Betta et al.
2004/0187483 A1 * 9/2004  Dalla Betta et al. ........... 60/286
2005/0025701 A1 * 2/2005  Bhat et al. .................... 423/652
2005/0103001 A1   5/2005  Kupe et al.
2006/0013760 A1   1/2006  Shi et al.

* cited by examiner

*Primary Examiner*—N. Bhat
(74) *Attorney, Agent, or Firm*—Paul V. Keller, PLC

(57) ABSTRACT

A power generation system and method of operating a power generation system which comprises a diesel engine which produces lean exhaust which passed to an exhaust after treatment system comprising an exhaust line which is in communication with a controller, reformer, lean NOx trap and SCR has been taught wherein the reformer comprises oxidation and reforming catalyst is a composition which comprises a catalyst wash coat comprising a $ZrO_2$ refractory metal oxide support, a $Ln_xO_y$ distributed on the surface of the refractory metal oxide in an amount to form a monolayer over the refractory metal oxide support wherein Ln is selected from the group consisting of La, Nd and mixtures thereof and Rh distributed over the catalyst surface in an effective amount to catalyze steam reforming at 650° C.

36 Claims, 2 Drawing Sheets

CATALYST COMPOSITION AND STRUCTURE FOR A DIESEL-FUELED AUTOTHERMAL REFORMER PLACED IN AND EXHAUST STREAM

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling $NO_x$ emissions from diesel-powered vehicles. One set of approaches focuses on the engine. Techniques such as exhaust gas recirculation and partially homogenizing fuel-air mixtures are helpful, but these techniques alone will not eliminate $NO_x$ emissions. Another set of approaches remove $NO_x$ from the vehicle exhaust. These include the use of lean-burn $NO_x$ catalysts, selective catalytic reduction (SCR) catalysts, and lean $NO_x$ traps (LNTs).

Lean-burn $NO_x$ catalysts promote the reduction of $NO_x$ under oxygen-rich conditions. Reduction of $NO_x$ in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean $NO_x$ reduction, introducing a fuel economy penalty of 3% or more. Currently, peak $NO_x$ conversion efficiencies for lean-burn $NO_x$ catalysts are unacceptably low.

SCR generally refers to selective catalytic reduction of $NO_x$ by ammonia. The reaction takes place even in an oxidizing environment. The $NO_x$ can be temporarily stored in an adsorbent or ammonia can be fed continuously into the exhaust. SCR can achieve high levels of $NO_x$ reduction, but there is a disadvantage in the lack of infrastructure for distributing ammonia or a suitable precursor. Another concern relates to the possible release of ammonia into the environment.

LNTs are devices that adsorb $NO_x$ under lean exhaust conditions and reduce and release the adsorbed $NO_x$ under rich conditions. An LNT generally includes a $NO_x$ adsorbent and a catalyst. The adsorbent is typically an alkaline earth compound, such as $BaCO_3$ and the catalyst is typically a combination of precious metals including Pt and Rh. In lean exhaust, the catalyst speeds oxidizing reactions that lead to $NO_x$ adsorption. In a reducing environment, the catalyst activates reactions by which hydrocarbon reductants are converted to more active species, the water-gas shift reaction, which produces more active hydrogen from less active CO, and reactions by which adsorbed $NO_x$ is reduced and desorbed. In a typical operating protocol, a reducing environment will be created within the exhaust from time-to-time to regenerate (denitrate) the LNT.

Regeneration to remove accumulated NOx may be referred to as denitration in order to distinguish desulfation, which is carried out much less frequently. The reducing environment for denitration can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, a portion of the reductant is generally expended to consume excess oxygen in the exhaust. To lessen the amount of excess oxygen and reduce the amount of reductant expended consuming excess oxygen, the engine may be throttled, although such throttling may have an adverse effect on the performance of some engines.

Reductant can consume excess oxygen by either combustion or reforming reactions. Typically, the reactions take place upstream of the LNT over an oxidation catalyst or in a fuel reformer. The reductant can also be oxidized directly in the LNT, but this tends to result in faster thermal aging. U.S. Pat. Pub. No. 2004/0050037 (hereinafter "the '037 publication") describes an exhaust system with a fuel reformer placed in an exhaust line upstream from an LNT. The reformer includes both oxidation and reforming catalysts. The reformer both removes excess oxygen and converts the diesel fuel reductant into more reactive reformate.

The oxidation and reforming catalysts of the '037 publication are subject to harsh conditions. According the '037 publication, it is desirable to heat the fuel reformer to steam reforming temperatures for each LNT regeneration and to pulse the fuel injection during regeneration to prevent the fuel reformer from overheating. Pulsing causes the catalyst to alternate between lean and rich conditions while at high temperature. The catalyst itself tends to undergo chemical changes through this cycling, which can lead to physical changes, especially sintering, which is the growth of catalyst particles. As the particles grow, their surface area and number of surface atoms decrease, resulting in a less active catalyst.

Numerous choices are available for the oxidation and reforming catalysts, With regard to the oxidation catalyst, the '037 patent lists Pd, Pt, Ir, Rh, Cu, Co, Fe, Ni, Ir, Cr, and Mo as possible choices, without limitation. The catalyst support is also important. The '037 patent lists as examples, without limitation, cerium zirconium oxide mixtures or solid solutions, silica alumina, Ca, Ba, Si, or La stabilized alumina. Many other oxidation catalysts, supports, and stabilizers are known in the art. Likewise, many examples or reforming catalysts are known. The '037 patent list Ni, Rh, Pd, and Pt as possible reforming catalysts, without limitation. As with the oxidation catalyst, a wide range of supports and stabilizers could be considered for use.

In spite of advances, there continues to be a long felt need for an affordable and reliable diesel exhaust aftertreatment system that is durable, has a manageable operating cost (including fuel penalty), and reduces $NO_x$ emissions to a satisfactory extent in the sense of meeting U.S. Environmental Protection Agency (EPA) regulations effective in 2010 and other such regulations.

SUMMARY

After considerable research, the inventors have developed oxidation and reforming catalysts for use in diesel exhaust aftertreatment systems. The catalysts are economical and superior in terms of durability under lean-rich cycling at high temperatures. The catalysts comprise precious metals supported on La stabilized refractory metal oxides. The La is distributed on the surface of the refractory metal oxide support in an amount to form at least about a monolayer, preferably about 1-2 monolayers. Preferably, the La is substantially amorphous in the sense of having no crystalline structure shown by X-ray diffraction. Nd and mixtures of La and Nd can be used in place of La. The La is typically in an oxide form and the precious metal may be either reduced or in oxide form.

In one embodiment, the catalyst is a reforming catalyst comprising an effective amount of Rh on a $ZrO_2$ support. The catalyst preferably comprises from about 0.5 to about 1.0 mg La per $m^2$ refractory metal oxide surface distributed over the surface. For a typical $ZrO_2$ support that has a surface area of about 100 $m^2/g$, this gives from about 5 to about 10% La by weight refractory metal oxide. The catalyst preferably also comprises from about 0.01 to about 0.1 mg Rh per $m^2$ refractory metal oxide surface area. The Rh is distributed on the surface of the refractory metal oxide particles along with or over the La. For the typical $ZrO_2$ support, this loading gives from about 0.1 to about 1.0% Rh by weight refractory metal oxide. The Rh is present in an amount effective to catalyze steam reforming of diesel fuel at 650° C. Preferably, the Rh has an average particle size of under 5 nm and the catalyst is functional to maintain the Rh particle size under 5 nm through 400 25 minute lean/25 minute rich lean/rich cycles at 750° C. Preferably, the Rh has a dispersion of at least about 40% and the catalyst is functional to maintain a dispersion of at least about 40% through 400 25 minute lean/25 minute rich lean/rich cycles at 750° C. Preferably, the catalyst comprises little or no platinum.

According to a further aspect of the invention, the Rh is provided in a relatively low concentration: from about 0.01 to about 0.05 mg per $m^2$ refractory metal oxide surface area, which corresponds to about 0.1 to about 0.5% Rh by weight refractory metal oxide for the typical $ZrO_2$ support. The inventors have found that if the Rh loading is kept sufficiently low, the Rh can be maintained in the form of small particles (less than 5 nm, typically about 2 nm or less) while the catalyst undergoes lean-rich cycling through an effect involving the La. The improvement in stability is such that as the Rh loading is reduced from about 0.10 mg/$m^2$ to about 0.05 mg/$m^2$ or less, nearly the same or greater catalyst activity results after aging than is achieved with the larger Rh loading.

In another embodiment, the catalyst is an oxidation catalyst comprising an effective amount of Pd on an $Al_2O_3$ refractory metal oxide support. The catalyst preferably comprises from about 0.5 to about 1.0 mg La per $m^2$ refractory metal oxide distributed over the surface of the refractory metal oxide particles. For a typical $Al_2O_3$ refractory metal oxide support that has a surface area of about 200 $m^2/g$, this corresponds to from about 10 to about 20% La by weight refractory metal oxide. The catalyst preferably also comprises from about 0.25 to about 1.0 mg Pd per $m^2$ refractory metal oxide surface area, which corresponds to from about 5 to about 20% Pd by weight refractory metal oxide for the typical $Al_2O_3$ refractory metal oxide support. The Pd is present in an amount effective for the oxidation catalyst to light off at 275° C., more preferably at 240° C. Preferably, the Pd has an average particle size of under 10 nm and is functional to maintain a particle size under 10 nm through 400 hours of 25 minute lean/25 minute rich lean/rich aging at 750° C. Preferably, the Pd has a dispersion of at least about 15% and the catalyst is functional to maintain a dispersion of at least about 15% through 400 hours of aging in a lean atmosphere comprising 10% steam at 750° C.

A further aspect of the invention relates to a method of operating a power generation system comprising operating a diesel engine to produce lean exhaust and passing the exhaust through a fuel reformer and a lean $NO_X$ trap in that order, whereby a portion of the $NO_X$ in the exhaust is absorbed by the lean $NO_X$ trap. From time-to-time, a control signal to regenerate the lean $NO_X$ trap is produced. In response to the control signal, diesel fuel is injected into the exhaust upstream from the fuel reformer at a rate that makes the exhaust-fuel mixture overall lean, whereby the injected fuel combusts within the fuel reformer raising the temperature of the fuel reformer. After the fuel reformer has heated to at least about 500° C., a rich phase is initiated by increasing the fuel injection rate and/or lowering the exhaust oxygen flow rate to cause the exhaust-injected fuel mixture to become overall rich, whereby the fuel reformer produces reformate that regenerates the lean $NO_X$ trap. The fuel reformer comprises oxidation and reforming catalysts. The reforming catalyst comprises a catalyst washcoat comprising a $ZrO_2$ refractory metal oxide support, a $Ln_xO_y$ distributed on the surface of the refractory metal oxide in an amount at least sufficient to form about a monolayer over the refractory metal oxide support, wherein Ln is selected from the group consisting of La, Nd, and mixtures thereof, and Rh distributed over the catalyst surface in an effective amount to catalyze steam reforming at 650° C. In one embodiment, the method further comprises discontinuing the fuel injection to allow the fuel reformer to cool in a lean phase and cycling repeatedly between the rich and lean phases to complete the regeneration of the lean $NO_X$ trap. This pulsed operation creates harsh operating conditions to which the claimed compositions are particularly well adapted.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
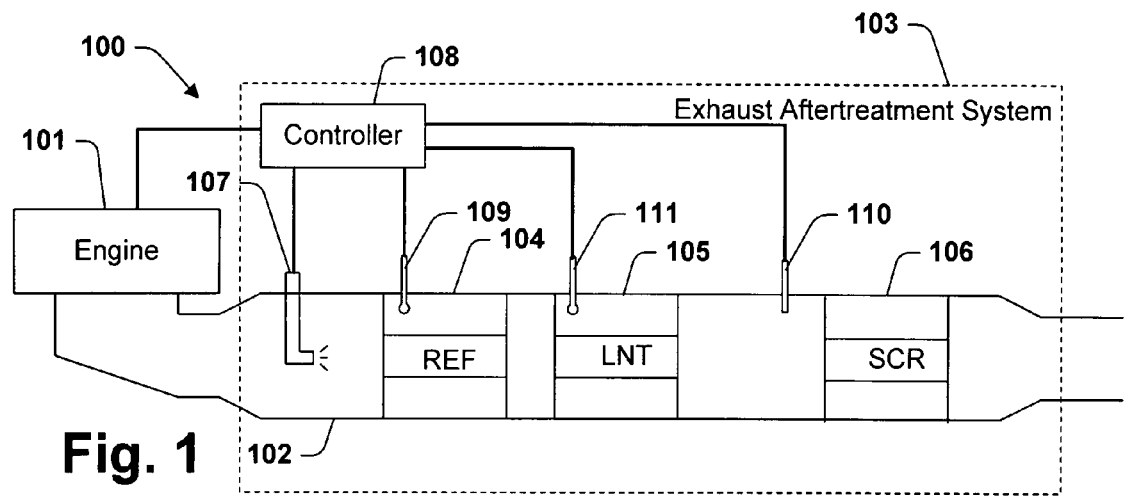
FIG. 1 is a schematic illustration of an exemplary exhaust aftertreatment system that can embody various concepts described herein.

The catalysts of the present disclosure are adapted to a particular application. FIG. 1 is a schematic illustration of an exemplary power generation system 100 embodying that application. The power generation system 100 is not the only power generation system to which the inventors' concepts are applicable, but the various concepts described herein were originally developed for systems like the system 100 and the individual components of the system 100 pertain to preferred embodiments. The power generation system 100 comprises a diesel engine 101 and an exhaust line 102 in which are configured components of an exhaust aftertreatment system 103. The exhaust aftertreatment system 103 comprises a fuel reformer 104, a lean $NO_X$ trap 105, and an ammonia-SCR catalyst 106. A fuel injector 107 is configured to inject fuel into the exhaust line 102 upstream from the fuel reformer 104. A controller 108 controls the fuel injection based on information about the operating state of the engine 101, a temperature of the fuel reformer 104 measured by a temperature sensor 109, and a $NO_X$ concentration measurement obtained by the $NO_X$ sensor 110 at a point in the exhaust line 102 downstream from the lean $NO_X$ trap 105. A temperature sensor 111 is configured to measure the temperature of the lean $NO_X$ trap 105, which is particularly important during desulfation.

The diesel engine 101 is a compression ignition engine. A compression ignition diesel engine normally produces exhaust having from about 4 to about 21% $O_2$. An overall rich exhaust-reductant mixture can be formed by injecting diesel fuel into the exhaust during cylinder exhaust strokes, although it is preferred that any reductant injection into the exhaust take place downstream from the engine 101. The engine 101 is commonly provided with an exhaust gas recirculation (EGR) system and may also be configured with an intake air throttle, either of which can be used to reduce the exhaust oxygen concentration and lessen the amount of reductant required to produce an overall rich exhaust-reductant mixture. A lean burn gasoline engine or a homogeneous charge compression ignition engine can be used in place of the engine 101. The engine 101 is operative to produce an exhaust that comprises $NO_X$, which is considered to consist of NO and $NO_2$.

The engine 101 is generally a medium or heavy duty diesel engine. The inventors' concepts are applicable to power generation systems comprising light duty diesel and lean burn gasoline engines, but the performance demands of exhaust aftertreatment systems are generally greater when the engine is a medium and heavy duty diesel engine. Minimum exhaust temperatures from lean burn gasoline engines are generally higher than minimum exhaust temperatures from light duty diesel engines, which are generally higher than minimum exhaust temperatures from medium duty diesel engines, which are generally higher than minimum exhaust temperatures from heavy duty diesel engines. Lower exhaust temperatures make $NO_X$ mitigation more difficult and place lower temperature light off requirements on fuel reformers. A medium duty diesel engine is one with a displacement of at least about 4 liters, typically about 7 liters. A heavy duty diesel engine is one with a displacement of at least about 10 liters, typically from about 12 to about 15 liters.

A light-off temperature for the fuel reformer 104 is an exhaust temperature at which when the fuel reformer 104 can be heated substantially above the exhaust temperature by combusting within the fuel reformer 104 fuel injected into the exhaust line 102 through the fuel injector 107. Typically, once the fuel reformer 104 has lit off, the fuel reformer 104 will remain substantially above the exhaust temperature even if the exhaust temperature is lowered somewhat below the light-off temperature, provided the fuel injection continues.

The exhaust from the engine 101 is channeled by a manifold to the exhaust line 102. The exhaust line 102 generally comprises a single channel, but can be configured as several parallel channels. The exhaust line 102 is preferably configured without exhaust valves or dampers. In particular, the exhaust line 102 is preferably configured without valves or dampers that could be used to vary the distribution of exhaust among a plurality of LNTs 105 in parallel exhaust channels. Valves or dampers can be used to reduce the exhaust flow to a fuel processor or LNT, allowing regeneration to be carried out efficiently even when exhaust conditions are unfavorable. Nevertheless, it is preferred that the exhaust line 102 be configured without valves or dampers because these moving parts are subject to failure and can significantly decrease the durability and reliability of an exhaust aftertreatment system.

Even when the exhaust line 102 is free from exhaust valves or dampers, an exhaust line upstream from the exhaust line 102 may still contain an exhaust valve, such as an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The exhaust line 102 is provided with an exhaust line fuel injector 107 to create rich conditions for LNT regeneration. The inventors' concepts are applicable to other method's of creating a reducing environment for regenerating the LNT 105, including engine fuel injection of reductant and injection of reductants other than diesel fuel. Nevertheless, it is preferred that the reductant is the same diesel fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

The diesel fuel is injected into the exhaust line 102 upstream from the fuel reformer 104. The fuel reformer 104 comprises an effective amount of precious metal catalysts to catalyze oxidation reactions at 275° C. and steam reforming reactions at 650° C. The fuel reformer 104 is designed with low thermal mass, whereby it can be easily heated to steam reforming temperatures for each LNT regeneration. Low thermal mass is typically achieved by constructing the fuel reformer 104 using a thin metal substrate to form a monolith structure on which the catalyst or catalysts are coated. A thin metal substrate has a thickness that is about 100 μm or less, preferably about 50 μm or less, and still more preferably about 30 μm or less.

Oxidation and reforming catalysts can be co-dispersed on the fuel reformer 104, but preferably, they are applied separately. The oxidation catalyst preferably forms a coating beginning proximate an inlet of the monolith and continuing part way toward or entirely to an outlet of the monolith. The reforming catalyst preferably forms a coating beginning proximate the outlet and continuing part way or entirely toward the inlet. In one embodiment, the reforming catalyst does not proceed entirely to the inlet, whereby injected fuel undergoes a substantial degree of reaction over the oxidation catalyst prior to encountering the reforming catalyst. The oxidation and reforming catalysts can occupy disjoint areas, abutting areas, or overlapping areas.

If the catalyst areas do overlap, either catalyst can be uppermost. Making the reforming catalyst uppermost has the advantage that it contact the reactants after the least diffusion. This is the preferred configuration if the reforming catalyst proceeds only partly toward the inlet. The reforming catalyst is more expensive than the oxidation catalyst, and it is therefore desirable that it be utilized as efficiently as possible. The oxidation catalyst, on the other hand, is least costly and can often be provided in greater quantity when more oxidation catalyst activity is desired. An advantage of applying the oxidation catalyst in a manner where the oxidation catalyst extends into the region under the reforming catalyst is that additional oxidation catalysis can be achieved in the same volume with essentially the same substrate thermal mass at relatively little extra expense as compared to the case where the oxidation catalyst terminates approximately where the reforming catalyst begins. On the other hand, making the oxidation uppermost has the advantage of increasing the extent of oxidation prior to contact with the reforming catalyst. This is the preferred configuration of the reforming catalyst extends to the inlet.

Steam reforming temperatures are at least about 500° C., which is generally above diesel exhaust temperatures. Diesel exhaust temperatures downstream from a turbocharger vary from about 110 to about 550° C. Preferably, the fuel reformer 104 can be warmed up and operated using diesel fuel from the injector 107 stating from an initial temperature of 275° C. while the exhaust from the engine 101 remains at 275° C. More preferably, the fuel reformer 104 can be warmed up and operated from initial exhaust and reformer temperatures of 240° C., and still more preferably from exhaust and reformer temperatures of 210° C. These properties are achieved by providing the fuel reformer 104 with effective amounts of precious metals, such as Pd, for catalyzing oxidation of diesel fuel at the starting temperatures. Low temperature start-up can also be improved by configuring a low thermal mass precious metal oxidation catalyst upstream from the fuel reformer 104. Preferably, the upstream catalyst combusts a portion of the fuel while vaporizing the rest. A mixing zone between the upstream catalyst and the fuel reformer 104 is also helpful.

The fuel reformer 104 is designed to light-off at relatively low temperature. Light-off is the phenomena whereby the fuel reformer 104 heats to approach a steady state temperature that is substantially above the exhaust temperature. Once lit off, the fuel reformer 104 has a tendency to remain heated even when the conditions bringing about light off are discontinued. Preferably, the fuel reformer 104 is adapted to light-off when the exhaust temperature is as low as about 275° C., more preferably when the exhaust temperature is as low as about 240° C., still more preferably when the exhaust temperature is as low as about 210° C.

The fuel reformer 104 is design to warm up to and produce reformate at steam reforming temperatures. Operation at steam reforming temperatures reduces the total amount of precious metal catalyst required. Having the fuel reformer 104 operate at least partially through steam reforming reactions significantly increases the reformate yield and reduces the amount of heat generation. In principal, if reformate production proceeds through partial oxidation reforming as in the reaction:

$$CH_{1.85} + 0.5O_2 \rightarrow CO + 0.925H_2 \qquad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \qquad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust.

Preferably, the fuel reformer 104 comprises enough steam reforming catalyst that at 650° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

An LNT is a device that adsorbs $NO_X$ under lean conditions and reduces $NO_X$ and releases $NO_X$ reduction products under rich conditions. An LNT generally comprises a $NO_X$ adsorbent and a precious metal catalyst in intimate contact on an inert support. Examples of $NO_X$ adsorbent materials include certain oxides, carbonates, and hydroxides of alkali and alkaline earth metals such as Mg, Ca, Sr, and Ba or alkali metals such as K or Cs. The precious metal typically consists of one or more of Pt, Pd, and Rh. The support is typically a monolith, although other support structures can be used. The monolith support is typically ceramic, although other materials such as metal and SiC are also suitable for LNT supports. The LNT 105 may be provided as two or more separate bricks.

The ammonia-SCR catalyst 106 is functional to catalyze reactions between $NO_X$ and $NH_3$ to reduce $NO_X$ to $N_2$ in lean exhaust. The ammonia-SCR catalyst 106 adsorbs $NH_3$ released from the LNT 105 during denitration and subsequently uses that $NH_3$ to reduce $NO_X$ slipping from the LNT 105 under lean conditions. Examples of ammonia-SCR catalysts include certain oxides of metals such as Cu, Zn, V, Cr, Al, Ti, Mn, Co, Fe, Ni, Mo, W, and Ce and zeolites, such as ZSM-5 or ZSM-11, substituted with metal ions such as cations of Cu, Co, Ag, or Zn. Ammonia-SCR can be accomplished using certain precious metals, but preferably the SCR catalyst 106 is substantially free of precious metals. Preferably, the ammonia-SCR catalyst 106 is designed to tolerate temperatures required to desulfate the LNT 105.

The exhaust aftertreatment system 100 can comprise other components, such as a diesel particulate filter and a clean-up oxidation catalyst. A thermal mass can be placed between the fuel reformer 104 and the LNT 105 to protect the LNT 105 from frequent exposure to high fuel reformer temperatures. A diesel particulate filter can be used as the thermal mass.

During normal operation, the engine 101 produces an exhaust comprising $NO_X$, particulate matter, and excess oxygen. A portion of the $NO_X$ is adsorbed by the LNT 105. The ammonia-SCR catalyst 106 may have ammonia stored from a previous denitration of the LNT 105. If the ammonia-SCR catalyst 106 contains stored ammonia, an additional portion of the $NO_X$ is reduced over the ammonia-SCR catalyst 106 by reaction with stored ammonia. The fuel injector 107 is generally inactive over this period, although small fuel injections might be used to maintain the fuel reformer 104 at a temperature from which it can be easily heated or to maintain the lean $NO_X$ trap 105 at a temperature at which it effectively absorbs $NO_X$.

From time-to-time, the LNT 105 must be regenerated to remove accumulated $NO_X$ (denitrated). Denitration generally involves heating the fuel reformer 104 to an operational temperature and then using the reformer 104 to produce reformate. The reformer 104 is generally heated by injecting fuel into the exhaust upstream from the fuel reformer 104 at a sub-stoichiometric rate, whereby the exhaust-reductant mixture remains overall lean and most of the injected fuel completely combusts in the reformer 104. This may be referred to as a lean warm-up phase. Once combustion has heated the reformer 104, the fuel injection rate can be increased and/or the exhaust oxygen flow rate reduced to make the exhaust-reductant mixture overall rich, whereupon the reformer 104 consumes most of the oxygen from the exhaust and produces reformate by partial oxidation and steam reforming reactions. The reformate thus produced reduces $NO_X$ absorbed in the LNT 105. Some of the $NO_X$ may be reduced to $NH_3$, which is absorbed and stored by the ammonia-SCR catalyst 106.

From time to time, the LNT 105 must also be regenerated to remove accumulated sulfur compounds (desulfated). Desulfation involves heating the fuel reformer 104 to an operational temperature, heating the LNT 105 to a desulfating temperature, and providing the heated LNT 105 with a rich atmosphere. Desulfating temperatures vary, but are typically in the range from about 500 to about 800° C., with optimal temperatures typically in the range of about 650 to about 750° C. Below a minimum temperature, desulfation is very slow. Above a maximum temperature, the LNT 105 may be damaged.

The LNT 105 is heated for desulfation in part by heat convection from the reformer 104. To generate this heat, fuel can be supplied to the reformer 104 under lean conditions, whereby the fuel combusts in the reformer 104. Once the reformer 104 is heated, the fuel injection rate can be controlled to maintain the temperature of the reformer 104 while the LNT 105 heats. Heating of the LNT 105 can be facilitated, and the temperature of the LNT 105 in part maintained, by frequently switching between lean and rich phases, whereby some oxygen from the lean phases reacts with some reductant from the rich phases within the LNT 105. The contribution of this method to heating the LNT 105 can be regulated through the frequency of switching between lean and rich phases.

During rich operation for either denitration or desulfation, the fuel reformer 104 tends to heat. Particularly when the exhaust oxygen concentration is at about 8% or higher, the heat produced removing oxygen from the exhaust tends to be greater than the heat removed by endothermic steam reforming, regardless of the fuel injection rate. Theoretically, increasing the fuel injection rate increases the proportion of endothermic steam reforming, but in practice this is not always effective to prevent the fuel reformer 104 from heating during rich operation. As a result, the, fuel reformer 104's temperature rises. To prevent overheating, fuel injection can be stopped and the fuel reformer 104 can be allowed to cool for a period before resuming rich regeneration. This results in alternating lean-rich condition within the fuel reformer 104 at high temperature. Operation at high temperatures and cycling between lean and rich conditions are detrimental to many catalysts.

The fuel reformer 104 preferably comprises both oxidation and reforming catalysts. When the exhaust-fuel mixture supplied to the fuel reformer is overall lean, the oxidation catalyst functions to combust nearly all the fuel and the reforming catalyst has little or no excess fuel to reform. When the fuel reformer has been heated sufficiently and the exhaust fuel mixture supplied to the fuel reformer is overall rich, the oxidation catalyst functions to combust a portion of the fuel to consume most of the oxygen in the exhaust and the reforming catalyst functions to generate syn gas through endothermic steam reforming. Preferably, the oxidation and reforming catalysts are in close proximity, whereby heat generated over the oxidation catalyst maintains the temperature of the fuel reforming catalyst.

Rh appears to be the most efficient steam reforming catalyst for the conditions created by the system 100. The effectiveness of rhodium depends on its dispersion. As an absolute number, dispersion is the number of surface-exposed rhodium atoms per gram. As a percentage, dispersion is the fraction of Rh that can be considered to be on the surface, in terms of its availability for reaction. The fraction of surface Rh depends on the average particle size of the Rh metal or Rh metal oxide. A catalyst with 1 wt % Rh loading and 100% dispersion (all surface Rh) would provide 97.1 µmoles surface Rh/g. Rh dispersion can be measured by chemisorption of $H_2$. For the present application, not only is a high initial dispersion of Rh desirable, but also a high dispersion after extensive lean operation and lean-rich cycling at elevated temperatures.

The inventors have evaluated several refractory metal oxide supports for Rh in the reforming catalyst. $TiO_2$ was determined to have insufficient thermal durability. Pure alumina is known to react with Rh. In an attempt to prevent such reaction, the alumina was pre-coated with $La_2O_3$ (e.g., 10% by weight alumina). At 1% Rh loading, initial dispersions of Rh were good, e.g., 70% dispersion and 1-2 nm rhodium particle size. After lean aging with 10% steam for 400 hours at 700° C., however, the rhodium dispersion was reduced to 10%. Using TGA, it was determined that 50% of the rhodium was no longer in the form of Rh particles (metal or oxide), suggesting it had dissolved in the La or alumina. Notably, such loss of particulate rhodium did not occur over 1000 hours of lean rich aging 750° C.

Lean rich aging, as the term is used herein, refers to the following processing or equivalents thereof. In a lean portion of the cycle, the catalyst is exposed to air with 10% steam for 25 minutes. In a rich portion of the cycle, the catalyst is exposed to nitrogen having 3.8% hydrogen and mixed with 10% steam for 25 minutes. In between the lean and rich portions of the cycle, the catalyst is flushed with nitrogen for 5 minutes. The absence of reduction in available rhodium after 1000 hours of lean rich aging 750° C. suggests that La in amounts sufficient to form at least about a monolayer coating over the refractory metal oxide can redistribute Rh under rich conditions.

Depositing 1% Rh on a La-stabilized $ZrO_2$ gave significantly better results than La-stabilized alumina under lean aging. At a 2.5% La loading, the Rh dispersion was 29% after steam aging for 400 hours at 700° C. 2.5% La on a 100 m²/g refractory metal oxide, which is the approximate surface area of the $ZrO_2$ support used in the experiments reported herein, corresponds to about a monolayer. When the amount of La is increased to 5%, the dispersion was 42% after steam aging for 400 hours at 700° C. Accordingly, a preferred reforming catalyst includes a $ZrO_2$ refractory metal oxide component. Preferably, the refractory metal oxide component consists essentially of $ZrO_2$. The $ZrO_2$ exists as submicron particles. Typical $ZrO_2$ surface areas are in the range from 70 to 130 m²/g.

Rh and $La_2O_3$ can be applied to the surfaces of the $ZrO_2$ particles by any suitable technique. Suitable techniques include precipitation and impregnation. Impregnation of Rh begins by adding Rh salts or nitric acid solutions of Rh salts to water. The water volume is adjusted to be slightly more (about 10% more) than the pore volume of the refractory oxide support. Exemplary rhodium salts include rhodium chloride and rhodium nitrate. After impregnation, the supports are dried at 150° C. for 2-3 hours. The dried powder is then calcined at 450° C. for two hours and finally calcined at 600-800° C. for four hours. Deposition of Rh from rhodium nitrate solution gives comparable dispersion to deposition of Rh from rhodium chloride, but rhodium nitrate has the advantage of being less corrosive. The Rh and the La can be incorporated in the same solution and impregnated onto the $ZrO_2$ in a single step or the Rh and La can be in separate solutions and incorporated onto the $ZrO_2$ in separate steps with a drying step in between each impregnation. Deposition of $La_2O_3$ prior to deposition of Rh in a two step process appears to give higher stability than deposition of $La_2O_3$ and Rh simultaneously in a one step process. The La and the Rh can be applied to the $ZrO_2$ either before or after the $ZrO_2$ is applied to a substrate such as a metal monolith.

Tables 1 and 2 show a series of results pertaining to the stability under aging of 1% $Rh/ZrO_2$ catalyst having various amounts of $La_2O_3$. The $La_2O_3$ is deposited on the surface of the $ZrO_2$ particles together with the Rh. 1% La appears to be insufficient to impart the desired stability under lean-rich cycling. 2.5% La based on the weight of the refractory metal oxide, has a significant beneficial effect. Further increasing the La loading to 5% or greater appears to provide a further improvement. Additional La loading at least up to about 20% does not appear to have any detrimental effect, but does not result in very significant further improvements. There was some indication that thicker $La_2O_3$ coatings would result in a separate $La_2O_3$ phase. Accordingly, it is preferred that the La loading be about 10% or less for the 100 $m^2/g$ refractory metal oxide. Preferably, the $La_2O_3$ is amorphous. An amorphous layer, as the term is used herein, is one that has no apparent crystalline structure shown by X-ray diffraction. A $La_2O_3$ particle with an average particle size of about 1 nm or less would not show a crystalline X-ray diffraction pattern.

TABLE 1

Rh dispersion results (%) for 1% $Rh/ZrO_2$ catalysts with varying amount of La after various periods of lean aging in 10% steam at 700° C.

|  | 4 hrs | 100 hrs | 500 hrs | 600 hrs |
|---|---|---|---|---|
| 1% La | 47 |  |  |  |
| 2.5% La | 72 | 24 | 29 | 20 |
| 2.5% La | 66 |  | 29 |  |
| 5% La | 64 | 30 | 41 | 24 |
| 5% La | 78 |  | 42 |  |
| 7.5% La | 67 | 32 |  | 25 |
| 10% La | 64 | 35 |  | 18 |

TABLE 2

Rh dispersion results (%) for 1% $Rh/ZrO_2$ catalysts with varying amount of La after various periods of cyclic lean-rich aging at 750° C.

|  | 4 hrs | 108 hrs | 250 hrs | 500 hrs |
|---|---|---|---|---|
| 1% La | 74 | 13 | 9 | 5 |
| 2.5% La | 75 | 34 | 19 |  |
| 5% La | 76 | 65 |  | 18 |

Figure 2:
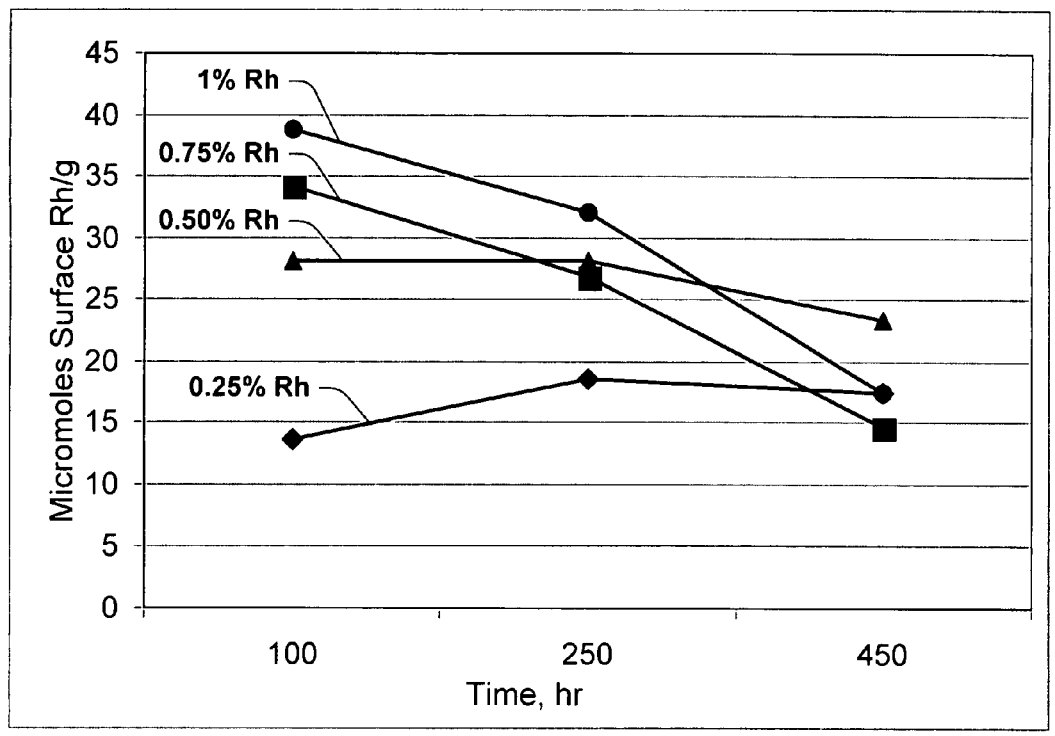
FIG. 2 Surface Rh in micromoles per g $ZrO_2$ on a 5% La/$ZrO_2$ support as a function of time under cyclic aging for various Rh loadings.

Table 3 shows the effect of Rh loading for a 5% $La/ZrO_2$ support. Dispersion on a percentage basis for aged samples improves as Rh loading decreases to a very surprising extent. As the Rh loading is decreased from 1% to about 0.5%, the dispersion after 120 hours aging increases to such an extent that the same or greater Rh activity (amount of surface Rh) is achieved with the smaller amount of Rh. As the Rh loading is further decreased to 0.25%, Rh dispersion continues to increase, whereby the Rh activity decreases only slightly as Rh loading is reduced from 0.5% to 0.25%. It appears that the Rh sinters to a markedly greater degree, forming particles that progressively grow, if Rh loading is about 0.75% or greater, whereas the Rh is effectively stabilized by the $La_2O_3$ if the Rh loading is about 0.5% or less. This result is further illustrated by FIG. 2, which plots surface Rh in micromoles per g as a function of time under cyclic aging for various Rh loadings and shows the stability of the 0.50% and 0.25% loading samples after the initial aging or "de-greening" period.

TABLE 3

Rh dispersion results (%) for 5% $La/ZrO_2$ catalysts with varying amount of Rh after various periods of cyclic lean-rich aging at 750° C.

|  | # of steps | 0 hrs | 5 hrs | 120 hrs |
|---|---|---|---|---|
| 1% Rh | 1 | 80 | 39 | 22 |
| 1% Rh | 2 | 114 | 52 | 29 |
| 0.75% Rh | 1 | 83 | 48 | 35 |
| 0.75% Rh | 2 | 108 | 49 | 45 |
| 0.50% Rh | 1 | 81 | 48 | 49 |
| 0.50% Rh | 2 | 110 | 52 | 57 |
| 0.25% Rh | 1 | 68 | 63 | 69 |
| 0.25% Rh | 2 | 105 | 65 | 57 |

The values of Rh loading relate to concentrations of Rh on the surface of the refractory metal oxide. For the material used in these tests, 0.5% Rh loading corresponds to 0.005 g Rh per 100 $m^2$ surface area. Thus, the Rh loading is preferably about $5 \times 10^{-5}$ $g/m^2$ or less. Interpolation of the data suggests that an Rh loading of $3.5 \times 10^{-5}$ $g/m^2$ or less is even more preferable.

The preferred loading of rhodium can also be characterized by the Rh particles retaining at least about 40% dispersion, more preferably at least about 50% dispersion, after 400 hours of lean-rich cyclic aging at 750° C. The phenomenon by which Rh loses dispersion is sintering: the growth of Rh particles. According, yet another way to characterize the preferred loading of rhodium is that Rh loading at which the Rh average particle size remaining at about 2 nm or less after 400 hours of lean-rich cyclic aging at 750° C. through interaction with the $La_2O_3$ coating. Particle size is defined as six times the particle volume divided by the particle surface area. This equation can be converted to an approximately correct equation to calculate Rh particle diameter in nm from Rh dispersion in percent: Rh particle diameter is about 100 nm divided by percent Rh dispersion. For example, the above case of a Rh catalyst with a dispersion of 50% has a particle diameter of about 2 nm.

Another of the inventors' concepts is to use $La_2O_3$ in the same manner to stabilize a precious metal oxidation. Pd is the precious metal. Tests were conducted with Pt on a 14% $La/Al_2O_3$ catalyst. Even 1% Pt added to 10% Pd caused a large degree of sintering. Accordingly, the precious metal of the oxidation catalysts preferably consists essentially of Pd.

A preferred refractory metal oxide for the oxidation catalyst is $Al_2O_3$. $ZrO_2$ and $Si-Al_2O_3$ also gave acceptable performance to the extent they were tested, although higher dispersions were obtained with $Al_2O_3$ then with $ZrO_2$. $Al_2O_3$ had a higher surface area than the $ZrO_2$, the $Al_2O_3$ being approximately 200 $m^2/g$ (170-230 $m^2/g$), which is an additional advantage over $ZrO_2$. Dispersion of Pd on $Al_2O_3$ was improved slightly by impregnating the Pd as $Pd(NH_3)_4(NO_3)$ solution as compared to impregnating the Pd as palladium nitrate-nitric acid solution. Sintering occurred much more rapidly when Pd chloride solutions were used.

Table 4 show the effect of La surface loading on the dispersion of 5% Pd over $ZrO_2$. 2.5% or more La significantly improved dispersion and dispersion stability on aging. Initial dispersions when the refractory metal oxide was Pd were higher, e.g., 22% for 5% Pd, 10% surface-deposited La, $Al_2O_3$. 5% La appears to be the minimum amount of surface La for a 200 $m^2/g$ alumina.

TABLE 4

Pd dispersion results (%) for 5% Pd/ZrO$_2$ catalysts with varying amount of La after various periods of lean aging at 700° C. in 10% steam.

| | 10 hrs | 240 hrs | 500 hrs |
|---|---|---|---|
| 0% La | 11% | 7% | 5.5% |
| 2.5% La | 19% | 12% | 11% |
| 5.0% La | 18% | 13% | 10% |
| 7.5% La | 19% | 13% | 11% |
| 10% La | 18% | 13% | 14% |

A high concentration of active (surface) Pd is useful in promoting low temperature light-off. The more active Pd/g, the lower the light-off temperature. The amount of active Pd/g depends on the surface area of the catalyst, the Pd loading, and the dispersion of the loaded Pd. 100% dispersion would give about 940 µmoles Pd/g for a 10 wt % Pd loading.

Experiments showed that Pd dispersion on a molar basis increases linearly with Pd loading up to about 15% for a 10% surface-deposited La/Al$_2$O$_3$ support, meaning that the dispersion remains constant on a percentage basis. Accordingly, the Pd loading is preferably at least about 10%, more preferably from about 15 to about 20%.

Figure 3:
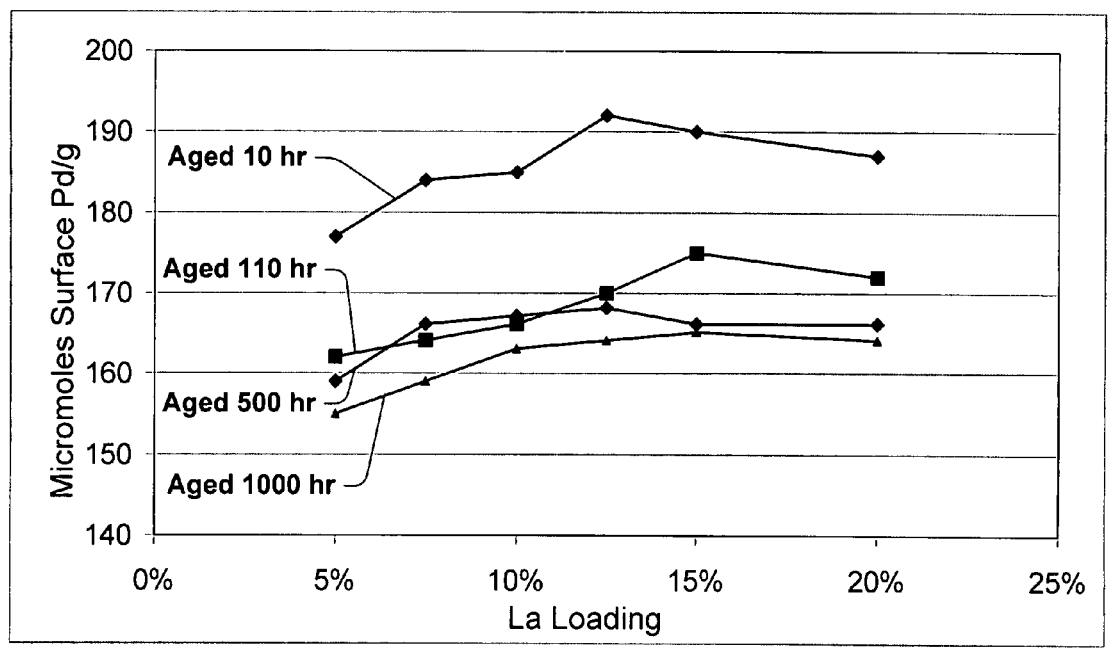
FIG. 3 shows the stability under steam aging of 10% Pd co-dispersed with various amounts of La on a commercially available La-stabilized $Al_2O_3$ support.

FIG. 3 shows the stability of 10% Pd co-dispersed with various amounts of La on a commercially available La-stabilized Al$_2$O$_3$ support. The commercial product contained about 4% La, prior to impregnation with Pd and additional La. The plot shows stability through 1000 hours of lean aging with 10% steam. Dispersion improves with La loading up to about 10 or 15%. X-ray diffraction data showed no separate La phase, even through 20% loading. Accordingly, the La loading is preferably at least about a monolayer, more preferably at least about 10%, and still more preferably from about 15% to about 25%. 10% La corresponds to about 0.5 mg La per m$^2$ and 20% La to about 1.0 mg La per m$^2$ distributed over the surface of the refractory metal oxide particles.

A series of tests were conducted replacing all or part of the La with Nd. Nd is chemically similar to La. Like La, Nd has a stable 3$^+$ charge. The tests showed that Nd is essentially fungible with La.

Other stabilizers were tested but did not show comparable advantages, either not improving dispersion, not improving stability, or interfering with catalyst activity. Sr in particular did not provided comparable performance to La. CeO$_2$ formed a separate phase on aging, which is undesirable in terms of maintaining dispersion. In addition, CeO$_2$ has substantial oxygen storage capacity, which is undesirable in this application.

The fuel reformer 104 typically has a metal or ceramic monolithic substrate comprising longitudinal channels through which the exhaust gas is designed to flow. The catalyst or catalysts can be applied as a washcoat layer on these channel walls. To apply the catalyst washcoat to the channel walls, a Pd—La—Al$_2$O$_3$ or Rh—La—ZrO$_2$ catalyst powder such as described above can be mixed with water and other components and milled or attrited to form a sol or colloidal dispersion of small particles of the catalyst in water. This sol can then be coated onto the monolithic structure and the monolithic structure dried and heat treated to form a catalyst unit comprising the catalyst washcoat on the monolith walls. Many variations of this process are available. The sol can be prepared by adding solutions of La and precious metal to a slurry of refractory metal oxide powder in water that is then milled or attrited to form the small particle sol that is then coated onto the monolith. Alternatively, the La can be impregnated onto the refractory metal oxide, which is then dried and calcined. The resulting material can then be mixed with water and a precious metal solution and the slurry milled or attrited to form the final sol that is coated onto the monolithic structure, followed by drying and heat treating to from the final catalytic unit. To form a segmented catalyst with the oxidation catalyst coated on the inlet section and the reforming catalyst on the outlet section of the reformer 104, the oxidation catalyst sol can be coated on an inlet section of monolith and the reforming catalyst sol can be coated on an outlet section of the monolith.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A power generation system, comprising:
a diesel engine operative to produce exhaust;
an exhaust aftertreatment system comprising an exhaust line configured to receive at least a portion of the exhaust;
a fuel reformer comprising an oxidation catalyst and a reforming catalyst configured within the exhaust line;
a lean NOx trap configured within the exhaust line downstream from the fuel reformer; and
a fuel injector configured to inject fuel into the exhaust line upstream from the fuel reformer;
wherein the reforming catalyst comprises a catalyst washcoat comprising:
a ZrO$_2$ refractory metal oxide support;
Ln$_X$O$_Y$ over the surface of the refractory metal oxide support in an amount at least sufficient to form about a monolayer over the refractory metal oxide support, wherein Ln is selected from the group consisting of La, Nd, and mixtures thereof; and
Rh over the surface of the refractory metal oxide support in an effective amount to catalyze steam reforming at 650° C.

2. The power generation system of claim 1, wherein the Ln$_X$O$_Y$ has no crystalline structure that is shown by X-ray diffraction.

3. The power generation system of claim 1, wherein the catalyst washcoat comprises from about 0.5 to about 1.0 mg La per m$^2$ refractory metal oxide surface distributed over the refractory metal oxide surface.

4. The power generation system of claim 1, wherein the catalyst washcoat comprises from about 2.5 to about 10% La by weight refractory metal oxide.

5. The power generation system of claim 1, wherein the oxidation and reforming catalysts are in two separate washcoats over a single monolith support, the oxidation catalyst washcoat extending from one end of the monolith support and the reforming catalyst washcoat extending from the other end.

6. The power generation system of 5, wherein the two washcoats are not coextensive.

7. The power generation system of claim 1, wherein the reforming catalyst consists essentially of $ZrO_2$, Rh, and Ln.

8. The power generation system of claim 1, wherein the Rh is present in an amount no greater than about $0.5 \times 10^{-5}$ gram per meter squared surface area of the refractory metal oxide support.

9. The power generation system of claim 1, wherein the washcoat comprises from about 0.2 to about 0.5% Rh by weight of the refractory metal oxide support.

10. The power generation system of claim 9, wherein the refractory metal oxide support has a surface area from about 75 to about 125 m2/g.

11. The power generation system of claim 1, wherein the Rh is present in the form of particles from about 1 to about 2 nm in size.

12. The power generation system of claim 1, wherein the $Ln_xO_Y$ is functional to stabilize the Rh during repeated cycling between lean and rich conditions at 750° C. by causing Rh agglomeration occurring during lean conditions to reverse during rich conditions, whereby the rhodium has an average particle size under 5 nm that remains under 5 nm after 400 hours of cyclic lean-rich aging at 750° C.

13. The power generation system system of claim 1, wherein the catalyst washcoat has a Rh dispersion of at least about 40% and is functional to maintain a Rh dispersion of at least about 40% through 400 hours of cyclic lean-rich aging at 750° C.

14. The power generation system of claim 1, wherein the oxidation catalyst consists essentially of $Al_2O_3$, Pd, and Ln.

15. The power generation system of claim 1, wherein the oxidation catalyst comprises a second catalyst washcoat comprising:
    a second refractory metal oxide support;
    $Ln_xO_Y$ over the surface of the second refractory metal oxide support in an amount at least sufficient to form about a monolayer over the second refractory metal oxide support; and
    Pd over the surface of the refractory metal oxide support in an effective amount to catalyze oxidation of diesel fuel at 275° C.

16. The power generation system of claim 15, wherein the second refractory metal oxide is $Al_2O_3$.

17. The power generation system of claim 15, wherein the catalyst comprises an effective amount of Pd to catalyze oxidation of diesel fuel at 240° C. and is function to remain so effective after 400 hours of cyclic lean-rich aging at 750° C.

18. The power generation system of claim 15, wherein the second catalyst washcoat comprises from about 5 to about 20% Pd by weight of the second refractory metal oxide.

19. The power generation system of claim 18, wherein the second catalyst washcoat comprises from about 10 to about 15% Pd by weight of the second refractory metal oxide.

20. The power generation system of claim 15, wherein the second catalyst washcoat comprises from about 0.25 to about 1.0 mg Pd per $m^2$ refractory metal oxide surface area.

21. The power generation system of claim 15, wherein the second catalyst washcoat comprises from about 10 to about 20% La by weight of the second refractory metal oxide.

22. The power generation system of claim 15, wherein the second catalyst washcoat comprises from about 0.5 to about 1.0 mg La per $m^2$ refractory metal oxide distributed over the surface of the refractory metal oxide particles.

23. The power generation system of claim 15, wherein the catalyst washcoat has a Pd dispersion of at least about 15% and is functional to maintain a Pd dispersion of at least about 15% through 400 hours of aging under 10% steam in air at 750° C.

24. The power generation system of claim 15, wherein the catalyst is substantially free of Pt.

25. A method of operating a power generation system, comprising:
    operating a diesel engine to produce lean exhaust comprising $NO_X$;
    passing the exhaust through a fuel reformer and a lean $NO_X$ trap in that order, whereby a portion of the $NO_X$ in the exhaust is absorbed by the lean $NO_X$ trap;
    from time-to-time, generating a control signal to regenerate the lean $NO_X$ trap;
    in response to the control signal, injecting diesel fuel into the exhaust at a rate that leaves the exhaust overall lean, whereby the injected fuel combusts within the fuel reformer, heating the fuel reformer; and
    after the fuel reformer has heated to at least about 500° C., initiating a rich phase by increasing the fuel injection rate and/or lower the exhaust oxygen flow rate to cause the mixture of exhaust and injected fuel to become overall rich, whereby the fuel reformer produces reformate that regenerates the lean $NO_X$ trap; wherein;
    the fuel reformer comprises oxidation and reforming catalysts; and
    the reforming catalyst comprises a catalyst washcoat comprising:
        a $ZrO_2$ refractory metal oxide support;
        $Ln_xO_Y$ over the surface of the refractory metal oxide support in an amount at least sufficient to form about a monolayer over the refractory metal oxide support, wherein Ln is selected from the group consisting of La, Nd, and mixtures thereof; and
        Rh over the surface of the refractory metal oxide support in an effective amount to catalyze steam reforming at 650° C.

26. The method of claim 25, further comprising:
    following the rich phase, discontinuing the fuel injection to allow the fuel reformer to cool in a lean phase; and
    cycling repeatedly between the rich and lean phases to complete the regeneration of the lean $NO_X$ trap.

27. The method of claim 25, wherein the catalyst washcoat comprises from about 2.5 to about 10% La by weight refractory metal oxide surface distributed over the refractory metal oxide surface.

28. The method of claim 25, wherein the catalyst washcoat comprises from about 0.5 to about 1.0 mg La per $m^2$ refractory metal oxide surface distributed over the refractory metal oxide surface.

29. The method of claim 25, wherein the reforming catalyst consists essentially of $ZrO_2$, Rh, and $Ln_xO_Y$.

30. The method of claim 25, wherein the Rh is present in an amount no greater than about $0.5 \times 10^{-5}$ gram per meter squared surface area of the refractory metal oxide support.

31. The method of claim 25, wherein the washcoat comprises from about 0.2 to about 0.5% Rh by weight of the refractory metal oxide support.

32. The method of claim 25, wherein the oxidation catalyst consists essentially of $Al_2O_3$, Pd, and Ln.

33. The method of claim 25, wherein the oxidation catalyst comprises a second catalyst washcoat comprising:
    a second refractory metal oxide support;

$Ln_XO_Y$ over the surface of the second refractory metal oxide support in an amount at least sufficient to form about a monolayer over the second refractory metal oxide support; and Pd over the surface of the refractory metal oxide support in an effective amount to catalyze oxidation of diesel fuel at 275° C.

34. The method of claim 33, wherein the second refractory metal oxide is $Al_2O_3$.

35. The method of claim 25, wherein the second catalyst washcoat comprises from about 0.25 to about 1.0 mg Pd per $m^2$ refractory metal oxide surface area.

36. The method of claim 25, wherein the second catalyst washcoat comprises from about 0.5 to about 1.0 mg La per $m^2$ refractory metal oxide distributed over the surface of the refractory metal oxide particles.

* * * * *